(12) United States Patent
Gottfried et al.

(10) Patent No.: US 10,671,912 B2
(45) Date of Patent: Jun. 2, 2020

(54) SPATIO-TEMPORAL SPIKING NEURAL NETWORKS IN NEUROMORPHIC HARDWARE SYSTEMS

(71) Applicant: SAP SE, Walldorf (DE)

(72) Inventors: Frank Gottfried, Walldorf (DE); Bjoern Deiseroth, Darmstadt (DE); Burkhard Neidecker-Lutz, Walldorf (DE)

(73) Assignee: SAP SE, Walldorf (DE)

( * ) Notice: Subject to any disclaimer, the term of this patent is extended or adjusted under 35 U.S.C. 154(b) by 732 days.

(21) Appl. No.: 15/264,316

(22) Filed: Sep. 13, 2016

(65) Prior Publication Data

US 2018/0075345 A1    Mar. 15, 2018

(51) Int. Cl.
*G06N 3/063*    (2006.01)
*G06N 3/04*    (2006.01)
*G06N 20/00*    (2019.01)
*G06N 3/08*    (2006.01)

(52) U.S. Cl.
CPC .......... *G06N 3/063* (2013.01); *G06N 3/04* (2013.01); *G06N 3/049* (2013.01); *G06N 20/00* (2019.01); *G06N 3/08* (2013.01); *G06N 3/088* (2013.01)

(58) Field of Classification Search
CPC .......... G06N 3/063; G06N 3/04; G06N 3/049; G06N 3/08; G06N 3/088; G06N 3/05; G06N 20/00; G06N 20/10; G06N 20/20
USPC ...................................... 706/25, 28
See application file for complete search history.

(56) References Cited

U.S. PATENT DOCUMENTS

| | | | |
|---|---|---|---|
| 2005/0197590 A1* | 9/2005 | Osorio | A61B 5/048 600/544 |
| 2013/0204819 A1* | 8/2013 | Hunzinger | G06N 3/049 706/25 |
| 2013/0339280 A1* | 12/2013 | Hunzinger | G06N 3/08 706/25 |
| 2014/0143193 A1 | 5/2014 | Zheng et al. | |

(Continued)

OTHER PUBLICATIONS

Pfeil, et al., "Six Networks on a Universal Neuromorphic Computing Substrate", Frontiers in Neuroscience, vol. 7, Feb. 18, 2013 (Year: 2013).*

(Continued)

*Primary Examiner* — Shane D Woolwine
(74) *Attorney, Agent, or Firm* — Klarquist Sparkman, LLP

(57) ABSTRACT

Technologies are provided for implementing temporal and spatio-temporal spiking neural networks (SNNs) using neuromorphic hardware devices. Temporal synapse circuits, with associated weight values, can be used to control spike times of connected neuron circuits. The controlled spike times of multiple neuron circuits can be used to temporally encode information in a neural network in neuromorphic hardware. Neuron circuits in a state space detection layer can be organized into multiple subsets. Neuron circuits in different subsets can be connected to output neuron circuits in an output layer by separate temporal synapse circuits. Spiking signals sent from the neuron circuits in the state space detection layer via separate temporal synapse circuits can cause associated output neuron circuits to generate output spiking signals at different times. The various spike times of the output neuron circuits can be aggregated to produce an output signal for the network.

20 Claims, 10 Drawing Sheets

(56) References Cited

U.S. PATENT DOCUMENTS

| | | | | |
|---|---|---|---|---|
| 2015/0193680 A1* | 7/2015 | Chan | ..................... | G06N 3/049 706/20 |
| 2017/0286828 A1* | 10/2017 | Smith | ................... | G06N 3/049 |
| 2017/0337469 A1 | 11/2017 | Debes et al. | | |

OTHER PUBLICATIONS

Schemmel et al., "Implementing Synaptic Plasticity in a VLSI Spiking Neural Network Model", The 2006 IEEE International Joint Conference on Neural Network Proceedings, 2006, pp. 1-6. (Year: 2006).*

Kreuz T, Chicharro D, Greschner M, Andrzejak RG. "Time-resolved and time-scale adaptive measures of spike train synchrony." Journal of neuroscience methods. Jan. 30, 2011; 195(1):92-106. (Year: 2011).*

Albus, J., "A new approach to manipulator control: The cerebella model articulation controller (CMAC)," *Journal of Dynamic Systems, Measurement and Control*, 1975.

Boahen, K., "Neurogrid: Emulating a million neurons in the cortex," *IEEE Engineering in Medicine and Biology Society Conference (EMBS 2006)*, p. 6702, 2006.

Cotter, N. and O.N. Mian, "A Pulsed Neural Network Capable of Universal Approximation," *IEEE Transactions on Neural Networks*, vol. 3, No. 2, pp. 308-314, Mar. 1992.

Davison, A. et al., "PyNN: a common interface for neuronal network simulators," *Frontiers in Neuroinformatics*, vol. 2, Art. 11, pp. 1-10, Jan. 27, 2009.

Eichenbaum, H., "Memory," *Scholarpedia*, vol. 3, No. 3, p. 1747, Revision #137659, 2008.

G.-q. Bi and M.-m. Poo, "Distributed synaptic modification in neural networks induced by patterned stimulation," *Nature*, vol. 401, No. 6755, pp. 792-796, 1999.

Khan, M. et al., "SpiNNaker: Mapping Neural Networks onto a Massively-Parallel Chip Multiprocessor," *International Joint Conference on Neural Networks*, pp. 2849-2856, 2008.

Lapedus Mark, "Neuromorphic Chip Biz Heats Up," *Semiconductor Engineering*, Jan. 21, 2016, retrieved from <http://semiengineering,com/neuromorphic-chip-biz-heats-up> on Jul. 5, 2016.

Maass, W., "Networks of Spiking Neurons: The Third Generation of Neural Network Models," *Institute for Theoretical Computer Science*, pp. 1-27, Aug. 4, 1997.

Pfeil, T. et al., "Six networks on a universal neuromorphic computing substrate," *arXiv*, pp. 1-23, 2013.

Rahimi and B. Recht, "Weighted Sums of Random Kitchen Sinks: Replacing minimization with randomization in learning," In D. Koller et al., Advances on neural information processing systems,, vol. 21, pp. 1313-1320, 2009.

Schemmel, J. et al., A Wafer-Scale Neuromorphic Hardware System for Larger-Scale Neural Modeling, *IEEE*, pp. 1947-1950, 2010.

Schmuker, M. et al., "A neuromorphic network for generic multivariate data classification," *PNAS*, vol. 111, No. 6, pp. 2081-2086, Feb. 11, 2014, retrieved from <www.pnas.org/cgi/doi/10.1073/pnas.1303053111>.

Sjöström, J. and W. Gerstner, "Spike-timing dependent plasticity," *Scholarpedia*, vol. 5, No. 2, p. 1362, Revision #142314, 2010.

Stewart, T., "A Technical Overview of the Neural Engineering Framework," *Center for Theoreticl Neuroscience Technical Report*, pp. 1-8, Oct. 29, 2012.

Szabó, Tamás and G. Horváth, "Improving the generalization capability of the binary CMAC," *IEEE*, 2000.

Tsodyks, M. and S. Wu, "Short-term synaptic plasticity," *Scholarpedia*, vol. 8, No. 10, p. 3153, Revision #142314, 2013.

Xie, X. et al., "Equivalence of Backpropagation and Contrastive Hebbian Learning in a Layered Network," *Neural Computation*, vol. 15, pp. 441-454, 2003.

Extended Search Report, counterpart European Patent Application No. 17001334.6, dated Feb. 5, 2018, 15 pages.

Indiveri et al., "Memory and Information Processing in Neuromorphic Systems," *Proceedings of the IEEE*, vol. 103, No. 8, pp. 1379-1397, 20 pages, Aug. 2015.

Yu et al., "Rapid Feedforward Computation by Temporal Encoding and Learning With Spiking Neurons," *IEEE Transactions on Neural Networks and Learning Systems*, vol. 24, No. 10, pp. 1539-1552, 14 pages, Oct. 2013.

European Communication, European Patent Application No. 17 001 334.6, 14 pages, dated Feb. 28, 2020.

"What is population coding? Describe the population coding model proposed by Georgopoulos in the 1980s for M1 control of arm direction," http://charlesfrye.github.io/FoundationalNeuroscience/49/, 4 pages, Apr. 12, 2016.

* cited by examiner

SPATIO-TEMPORAL SPIKING NEURAL NETWORKS IN NEUROMORPHIC HARDWARE SYSTEMS

BACKGROUND

Spiking neural networks (SNNs) can exchange information between neurons via electric pulses, referred to as spikes or spiking signals. Due to this spiking, the behavior of SNNs is more similar to the behavior of neuro-biological systems than the behavior of non-spiking artificial neural networks. Although SNNs exhibit powerful theoretical capabilities, their poor performance on traditional computer hardware has made them unsuitable for many practical applications. Recently, neuromorphic hardware devices have been developed that can improve the power consumption, intrinsic parallelism, and processing speed for many types of neural networks. However, adaptation of many classical neural network methodologies to neuromorphic hardware has proved to be difficult, if not impossible.

Therefore, there is room for improvement in technologies related to spiking neural networks in neuromorphic hardware systems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a system comprises a spiking neural network in neuromorphic hardware. The spiking neural network comprises a state space detection layer comprising multiple neuron circuits configured to transmit spiking signals to connected synapse circuits; the synapse circuits comprising stored weight values and configured to: apply the stored weights to the spiking signals, transmit the weighted spiking signals to connected output neuron circuits, and dynamically adjust the stored weights when a connected state space detection layer neuron circuit transmits a spiking signal or when a connected output neuron circuit transmits an output spiking signal; an output layer comprising the output neuron circuits, wherein the output neuron circuits comprise membrane potentials and are configured to: accumulate the received weighted spiking signals from the synapse circuits at the membrane potentials, and transmit output spiking signals when the values of the membrane potentials are greater than specified thresholds; and an output spiking signal accumulator configured to: receive the output spiking signals, determine times at which the output spiking signals are received, and generate a network output signal based on the times at which the output spiking signals are transmitted by the output neuron circuits.

In another embodiment, a method for temporal encoding of information using a spiking neural network in neuromorphic hardware comprises: transmitting multiple spiking signals from multiple neuron circuits to multiple output neuron circuits over multiple temporal synapse circuits; adjusting the multiple spiking signals using multiple weights associated with the temporal synapse circuits; receiving the adjusted multiple spiking signals at the multiple output neuron circuits and adjusting capacities of the multiple output neuron circuits based on the received adjusted multiple spiking signals; transmitting multiple output spiking signals from the multiple output neuron circuits when the adjusted capacities of the multiple output neuron circuits are greater than or equal to specified thresholds associated with the multiple output neuron circuits; generating a weighted average time of multiple times at which the multiple output neuron circuits transmitted the multiple output spiking signals; and transmitting the weighted average time as an output signal of the neural network.

In another embodiment, a computer-readable storage medium stores computer-executable instructions that, when executed, configure a neuromorphic processing unit to create a spatio-temporal spiking neural network. The spatio-temporal spiking neural network comprises multiple neuron circuits organized into two or more subsets, wherein the multiple neuron circuits are configured to: receive multiple input signals, for at least one of the subsets, select a neuron circuit within the subset that received a greatest number of input signals with respect to other neuron circuits within the subset, and transmit one or more spiking signals from the at least one selected neuron circuit to at least one synapse circuit connected to the at least one selected neuron circuit; multiple spike-time dependent plasticity (STDP) synapse circuits storing synaptic weights and configured to: receive the one or more spiking signals from the at least one selected neuron circuits, amplify the received one or more spiking signals using the stored synaptic weights, and transmit the amplified one or more spiking signals to one or more connected output neuron circuits; multiple output neuron circuits comprising charge capacities and configured to: receive the amplified one or more spiking signals, store charges of the amplified one or more spiking signals in the charge capacities of one or more of the output neuron circuits, and for at least one of the output neuron circuits: detect that a stored charge in a charge capacity of the output neuron circuit is greater than a spiking threshold of the output neuron circuit; and transmit an output spiking signal from the output neuron circuit; and an output spiking signal accumulator configured to: receive output spiking signals from the at least one of the output neuron circuits, and generate an output signal based one or more times at which the output spiking signals were received.

As described herein, a variety of other features and advantages can be incorporated into the technologies as desired.

DETAILED DESCRIPTION

Example 1—Overview

Figure 1:
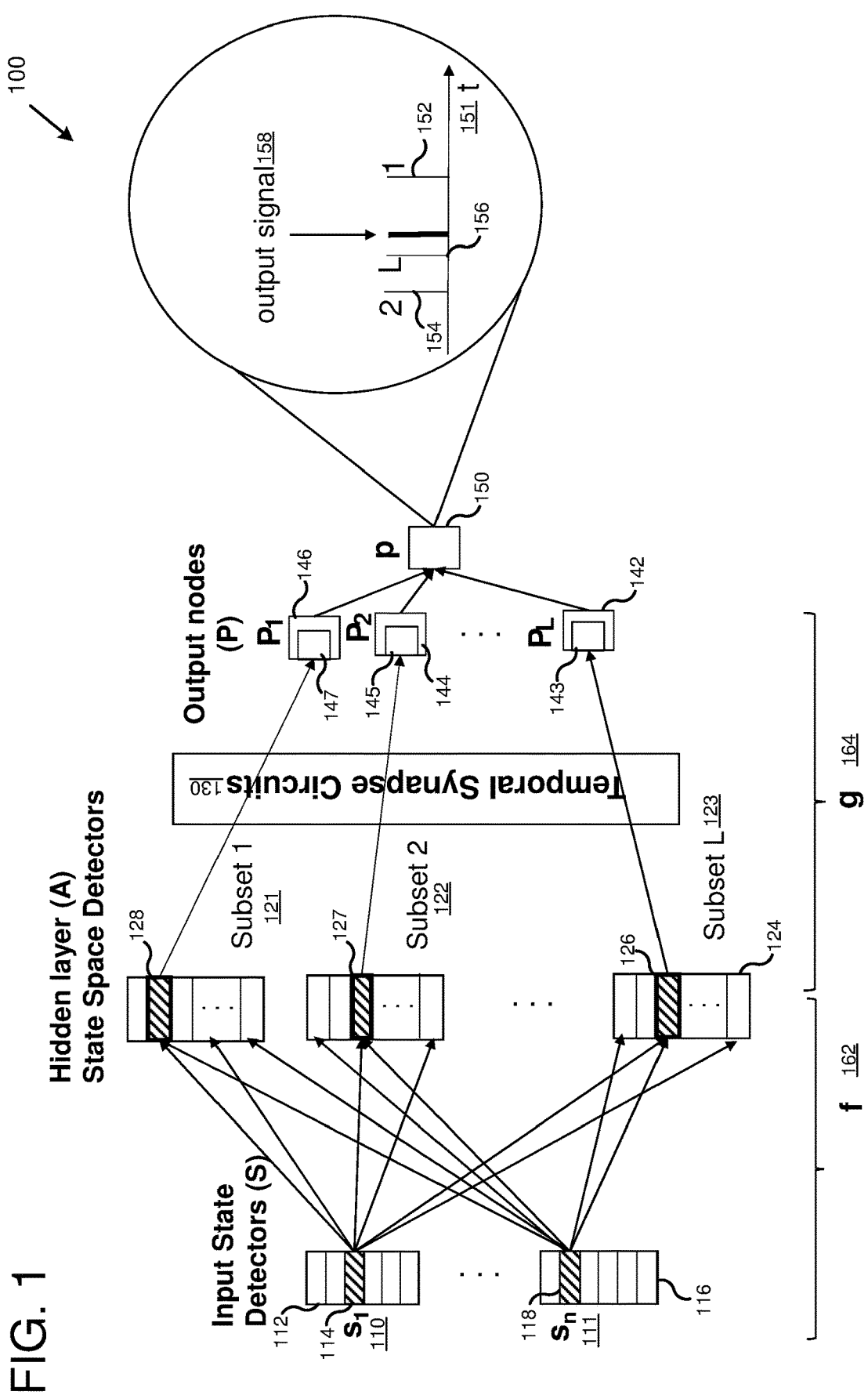
FIG. 1 is a block diagram depicting an example system comprising a spatio-temporal spiking neural network.

The description provided herein is directed to implementing spiking neural networks (SNNs) in neuromorphic hardware.

It is difficult, if not impossible, to translate classical neural network solutions, implemented on Von Neumann architectures, to neuromorphic hardware. A significant difficulty in translating such classical solutions is the absence of access to traditional memory primitives in many neuromorphic hardware devices.

Various technologies described herein can be used to implement temporal spiking neural networks (SNNs) using temporal synapse circuits and neuron circuits that, in combination, can encode information temporally using spiking signals. Learning can be based on a deterministic training scheme. When a supervised training signal is available, on-line learning can be applied to adjust weights associated with the temporal synapse circuits, such that a network output approaches the training signal. Alternatively, the weights for the temporal synapse circuits can determined offline and applied statically to the temporal synapse circuits during an initial setup phase. In cases where no training signal is provided, the network can determine an output based on previously learned parameter settings.

Various technologies described herein can be used to implement spatio-temporal SNNs by organizing neuron circuits in a state space detection layer into multiple subsets and connecting neuron circuits in different subsets to different output neuron circuits via separate temporal synapse circuits. By combining population (i.e., spatial) and temporal encoding for information representations, such a spatio-temporal SNN can provide local generalization and fast learning in a robust manner. Furthermore, the required network size is smaller (in some cases much smaller) than the required network sizes of other neural network models, such as multi-layer perceptions.

Various technologies described herein can be applied to solve regression and classification problems. The temporal and spatio-temporal SNNs described herein can perform classification and/or regression much faster than neural networks implemented on Von Neumann architectures. Also, such networks can yield better approximation results for small generalization widths than classical neural networks. This can be an important feature in practical applications as many real-world data sets often involve many different input channels and sparse training data. As an additional advantage, temporal and spatio-temporal SNNs described herein can be more energy efficient than some other neural networks, since the temporal encoding described herein can require fewer spikes to encode information than other encoding techniques, such as rate encoding.

Example 2—Spatio-Temporal Spiking Neural Network

In any of the examples herein, a spiking neural network using neuron circuits and temporal synapse circuits can be provided for performing classification and/or regression using spatial and temporal encoding ("spatio-temporal encoding").

FIG. 1 is a block diagram depicting an example system 100 comprising an example spatio-temporal spiking neural network. In the example, multiple input state detectors (e.g., 112, 114, 116, and 118) are configured to transmit one or more input signals to multiple state space detectors (e.g., 124, 126, 127, and 128) when certain input stimuli (not shown) are detected. The input state detectors can be input circuits in one or more neuromorphic hardware devices. The input state detectors can be organized into multiple input state detector sets (e.g., $S_1$ 110-$S_n$ 111). In at least some embodiments, the input state detector set can be configured such that, at most one input state detector in each set transmits a signal at a given time. For example, in FIG. 1, the input state detector 114 in set S1 110 is depicted as being active and transmitting a signal to multiple state space detectors, while the remainder of the input state detectors in set S1 110 (e.g., 112) are depicted as being inactive. Similarly, the input state detector 118 in set Sn 111 is depicted as being active and transmitting a signal to multiple state space detectors, while the remainder of the input state detectors in the set Sn 111 (e.g., 116) are depicted as being inactive.

The input state detectors are connected to the state space detectors by multiple connections, such that each input state detector is connected to one or more state space detectors. More than one input state connector can be connected to a same state space detector. For example, the input state connectors 114 and 118 are both connected to the state space detectors 126, 127, and 128. The connections between the input state detectors and the state space detectors can be synapse circuits in one or more neuromorphic hardware devices. In embodiments where the state space detectors are organized into multiple subsets, separate input state detectors can be configured to transmit input signals to state space detectors in separate subsets. For the sake of clarity, only a subset of the connections that are transmitting signals are depicted in FIG. 1. Connections between inactive input state detectors and the state space detectors are not shown.

The state space detectors are configured to receive signals from the input state detectors and transmit spiking signals to one or more output nodes (e.g., 142, 144, and 146) over one or more temporal synapse circuits 130 when certain activation conditions are present. The state space detectors can be neuron circuits in one or more neuromorphic hardware devices. The state space detectors can be configured to transmit spiking signals periodically (for instance, once every millisecond) while the activation conditions are present. The activation conditions, at least in some circumstances, can be receipt of one or more signals from one or more input state detectors. Alternatively or additionally, a state space detector can comprise a potential that can receive and temporarily accumulate one or more signals from one or more input state detectors. In such an embodiment, the activation conditions can comprise having a potential greater than or equal to a specified threshold. In a further embodiment, the value of the potential can be cleared once the spiking signal is transmitted. In a different or further embodiment, the value of the potential can decay over a period of time until it returns to a default or resting value.

In at least one embodiment, the state space detectors are grouped into multiple subsets (e.g., Subset 1 121, Subset 2 122, and Subset L 123). In such an embodiment, the state space detectors can be configured such that only one state space detector transmits a spiking signal at a given time. For example, in FIG. 1 the state space detector 128 in Subset 1

121 is depicted as being active and transmitting a spiking signal to the output node P$_1$ 146, while the rest of the state space detectors in Subset 1 121 are depicted as being inactive. Similarly, the state space detector 127 in Subset 2 122 is depicted as being active and transmitting a spiking signal to the output node P2 144, while the rest of the state space detectors in the Subset 2 122 are depicted as being inactive. Similarly, the state space detector 126 in Subset L 123 is depicted as being active and transmitting a spiking signal to the output node P$_1$ 142, while the rest of the state space detectors in the Subset 2 122 are depicted as being inactive.

The state space detectors are connected to the output nodes by multiple temporal synapse circuits 130. In some embodiments, each state space connector is connected to one output node. Alternatively, a state space connector can be connected to more than one output node. In a different or further embodiment, the state space detector subsets 1 121-L 123 are each associated with a separate output node. In such an embodiment, all the state space detectors in a given subset can be connected to an output node associated with the given subset.

For the sake of clarity, only the temporal synapse circuits actively transmitting signals from the state space detectors 126-128 are depicted. The temporal synapse circuits connecting the inactive state space detectors to the output nodes are not depicted. As discussed further below, the temporal synapse circuits 130 can comprise weights that can be applied to received spiking signals to adjust values of the spiking signals. The temporal synapse circuits 130 can then transmit the adjusted spiking signals to the connected output nodes.

The output nodes P$_1$ 146, P$_2$ 144, . . . , P$_L$ 142 are configured to receive the spiking signals from the temporal synapse circuits. The output nodes comprise membrane potentials (e.g., 143, 145, and 147) (a.k.a., neuron potentials). The output nodes can be neuron circuits in one or more neuromorphic hardware devices.

An output node is configured to apply values of one or more received spiking signals' values to its potential. When the value of the potential is greater than or equal to a spiking threshold associated with the output node, the output node is configured to transmit an output spiking signal to an output spiking signal accumulator p 150. In at least some embodiments, the output node is configured to clear the value of its membrane potential when the output spiking signal is transmitted. For example, the membrane potential of the output node can comprise a capacitor that accumulates charge as spiking signals are received. When the output node detects that the charge in the capacitor is greater than or equal to the specified threshold, the charge can be released as an output spiking signal. Other embodiments are also possible.

The temporal synapse circuits transmitting the spiking signals to the output nodes can be associated with different weights that are applied to the different spiking signals. For example, the different weights can be applied by the temporal synapse circuits to amplify the spiking signals by different amounts. This can cause one output node receiving spiking signals from one temporal synapse circuit to transmit an output spiking signal at a different point in time than another output node receiving a different spiking signal from a different temporal synapse circuit.

The output spiking signal accumulator p 150 can be configured to detect the different times at which output signals are received from different output nodes and to generate an output signal based on the different times. For example, a timeline 151 is depicted in FIG. 1. In this example, an output spiking signal is received from the output node P$_1$ 146 at time 152, a second output spiking signal is received from the output node P$_2$ 144 at time 154, and a third output spiking signal is received from the output node P$_L$ 142 at time 156. The output spiking signal accumulator p 150 is configured to generate an output signal 158 based on the times at which the output spiking signals were received. For example, the output signal can be a weighted average of the different times. The output signal 158 can be transmitted as an output of the network. The output spiking signal accumulator p 150 can comprise one or more hardware and/or software components.

In at least some embodiments, the state space detectors (e.g., 124, 126, 127, and 128) can comprise membrane potentials. In such an embodiment, a state space detector can be configured to generate a spiking signal when a value of its potential is greater than or equal to a spiking threshold associated with the state space detector.

The example system 100 can be used to develop an associative memory and/or to approximate continuous nonlinear functions similar to multi-layer perceptrons (MLPs). However, depending on the configuration of the connections between the input state detectors and the state space detectors, the number of state space detectors that determine the actual output signal may represent a small subset of the total number of state space detectors. In at least some embodiments, input state detectors that are located close to one another can be connected to at least some of the same state space detectors. In such an embodiment, the connections can be configured to produce local generalizations, i.e., similar inputs can produce similar outputs while distant inputs can produce (nearly) independent outputs. This can lead to very efficient and fast learning processes that allow for real-time applications, such as adaptive control.

The example system 100 can be organized in a three-layer feed-forward embodiment. Such an embodiment is depicted in FIG. 1. Such a three-layer feed-forward network can comprise two consecutive transformations f 162: S→A and g 164: A→P. The transformation f 162 can map an input vector s∈S (e.g., 114 and 118) to a binary hidden (association) cell vector a∈A (e.g., 126, 127, and 128), while g 164 can compute the network response p∈P (e.g. p 150) from the activated cells a.

The transformation f 162 can realize a particular nonlinear quantization of the input space. For example, every input s can be mapped to a binary vector a, where $a_j$=1 indicates that the input lies within the receptive field of a cell j, and vice versa. The width of the receptive fields can quantify the local generalization of the network and can correspond to the number of active input state space detectors. The number of active state space detectors is denoted herein by the parameter G. In at least some embodiments, the connections between the input state detectors and the state space detectors can be regular and sparse. In such an embodiment, every input state detector leads to an activation of exactly L state space detectors in A, one in each of the organized L subsets 121-123. Alternative definitions of f 162 are also possible.

In at least some cases, the described mapping can imply nice characteristics. Firstly, the connectivity can be static and does not need to change after it is initialized. Secondly, neighboring inputs can lead to similar activation patterns in the association layer A. In such a case, as distance in the input space increases, a number of jointly activated state space detectors can decrease and, ultimately reach zero when the distance exceeds G. The representational complexity of the association memory can depend on the number of activated state space detectors that is given by L. Thus, the activation layer A can realize local embeddings of the input space, parameterized by G and L. In at least some embodiments, L can be equal to G.

In some cases, spiking neural networks (SNNs) can exhibit powerful theoretical advantages compared to traditional artificial neural networks. SNNs can exchange information between neurons via short electric pulses (a.k.a., spikes or spiking signals). Neurons (e.g., neuron circuits) in an SNN can be connected by either inhibitory or excitatory synapses (e.g., synapse circuits, such as temporal synapse circuits). A spike can leave a decaying trace at a synapse, over which the neuron can integrate its capacity state, which itself can decay back to a predefined rest-capacity. Once an activation threshold (a.k.a., a spiking threshold) is exceeded, the neuron can generate a new spiking signal on one or more outgoing synapses. In at least some embodiments, the neuron returns to its rest-capacity after transmitting the spiking signal. Thus, in at least some cases, timing can play an important role as neuron activity quickly decays back to a default rest-state.

In at least some embodiments, information may be encoded in spiking times and/or relative spike distances.

A least three different encoding schemes are possible in an SNN: (i) rate encoding, (ii) temporal encoding, and (iii) population encoding. The former encodes activations in the firing rate of a neuron, while any information related to the temporal structure of the spike train is not taken into account. Rate encoding can be robust against noise, but the information density can be relatively low. Additionally, training in rate encoding can be based on activity-dependent synaptic weight modifications.

Temporal encoding can have a higher information density than rate coding. The encoding can be based on the timing of individual spikes. In such a case, activations can be processed relatively quickly and without storing or averaging. However, in some cases, disturbances of only a single spike time may have a major impact.

In population encoding, activations are encoded spatially, involving groups (populations) of different neurons. In some cases, only a small number of neurons is active at any given point in time. In such cases, population encoding provides a sparse distributed representation of a signal.

Modelling memory in a spiking manner is not as straightforward as in classical von Neumann architectures. Synaptic plasticity, which is a dynamic primitive modeled on neuromorphic hardware in which weights associated with synapse circuits are dynamically adjusted, can be used to adjust overall network energy and thus to adapt the network towards an observed spike behavior.

At least two different types of synaptic plasticity can be used to dynamically adjust synapse weights. The two types are referred to herein as "fast dynamics" and "slow dynamics." Fast dynamics can transform a synapse weight temporarily, i.e. the weight can be increased or decreased depending on the spiking behavior of one or more connected neurons, but over time the synapse returns to its initial weight. In at least some cases, fast dynamics can be used to model a working memory by adjusting a spiking rate of a neuron.

Slow dynamics can have permanent effects. A synapse weight change made by slow dynamics can remains until the weight is changed again. Such a weight change can be used to implement a learning rule, such as the Hebbian learning rule, which, in at least some cases, can be equivalent to backpropagation in machine learning. However, in at least some embodiments, slow dynamics changes a synaptic weight whenever a pre-connected neuron or a post-connected neuron spikes. This can make slow dynamics difficult to use as a reliable primitive in cases where it is preferable for retrieval to leave the stored values unchanged.

Figure 2:
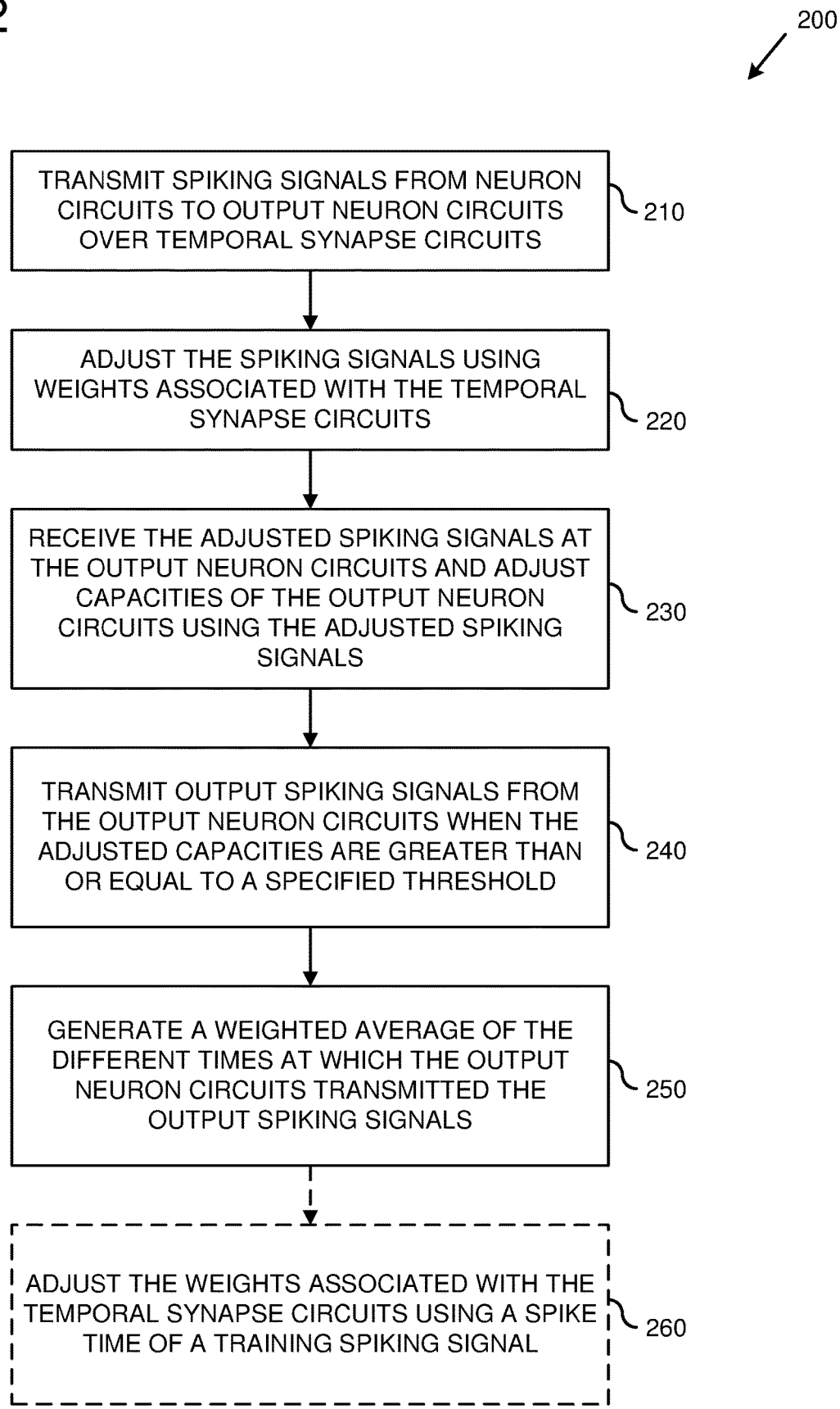
FIG. 2 is a flowchart depicting an example method for temporal spiking in a neuromorphic hardware-implemented neural network.

FIG. 2 is a flowchart depicting an example method 200 for temporal encoding of information using a spiking neural network in neuromorphic hardware. The example method 200 can be performed using any of the example systems described herein.

At 210, spiking signals are transmitted from one or more neuron circuits in a state space detection layer of the neural network to one or more output neuron circuits in an output layer of the neural network over one or more temporal synapse circuits.

In at least some embodiments, the one or more spiking signals can be generated by the one or more neuron circuits in the state space detection layer in response to receiving one or more input signals from one or more input circuits in an input state detection layer of the neural network. In at least one embodiment, the neuron circuits in the state space detection layer are organized into multiple subsets. In such an embodiment, transmitting a spiking signal can comprise identifying a neuron circuit in a given subset that received a greatest number of input signals compared to other neuron circuits in the given subset and transmitting a spiking signal from the identified neuron circuit to one or more of the output neuron circuits in the output layer. In some configurations, the subsets can be associated with different output neuron circuits in the output layer. In such a configuration, neuron circuits in a given subset are connected to an output neuron circuit associated with the given subset. In an embodiment where a neuron circuit in the given subset with a greatest number of input signals in the subset is activated, the identified neuron circuit can transmit a spiking signal to the output node associated with the subset via a temporal synapse circuit.

At 220, the one or more spiking signals are received by the one or more temporal synapse circuits and the one or more spiking signals are adjusted using one or more weights associated with the temporal synapse circuits. A weight associated with a temporal synapse circuit can be stored by the synapse circuit. The weight can, for example, take the form of an electrical charge that is held by a portion of the temporal synapse circuit. A temporal synapse circuit can adjust a received spiking signal using the stored weight and transmit the adjusted spiking signal to a connected output neuron circuit in the output layer. The temporal synapse circuits can be associated with different weights. In at least one embodiment, each temporal synapse circuit connects a single neuron circuit in the state space detection layer with a single output neuron circuit in the output layer.

In some embodiments, the synapse weights can be dynamically adjusted when connected neuron circuits generate spiking signals. For example, a weight of a temporal synapse circuit can be adjusted when a neuron circuit in the state space detection layer transmits a spiking signal to the temporal synapse circuit. In a different or further embodiment, the weight of a temporal synapse circuit can be adjusted when an output neuron circuit connected to the temporal synapse circuit generates an output spiking signal. Such dynamic adjustments can be temporary. In at least some cases, the value of an adjusted weight returns back to a resting value over time. Particular examples of dynamic synapse weight adjustments in response to the generation of spiking signals are provided below with the discussion of FIG. 3.

At 230, the one or more adjusted spiking signals are received by the one or more output neuron circuits and used to adjust capacities of the one or more output neuron circuits. An output neuron circuit can comprise a capacity, such as a charge capacity or potential, to which an adjusted spiking signal can be added. When an adjusted capacity of an output neuron circuit is greater than or equal to a specified threshold, at 240 the output neuron circuit transmits an output spiking signal. An output neuron circuit can receive more than one adjusted spiking signal. For example, in the presence of input stimuli, a neuron circuit in the state space detection layer may transmit multiple spiking signals to an output neuron circuit over a period of time. The spiking signals, adjusted by a weight temporal synapse circuit connecting the neuron circuit to the output neuron circuit, can be received by the output neuron circuit in succession and applied toward the output neuron circuit's capacity. In a different or further embodiment, an output neuron circuit can receive multiple adjusted spiking signals from multiple temporal synapse circuits.

In at least some embodiments, the capacity of an output neuron circuit decays over time. For example, a capacity value of the output neuron circuit can decay linearly or nonlinearly (e.g., exponentially) over time until resting value, such as 0, is reached.

Once the capacity of an output neuron circuit meets or exceeds the specified threshold, the output neuron circuit generates an output spiking signal. Since the temporal synapse circuits can be associated with different weights, different output neuron circuits in the output layer can generate output spiking signals at different points in time.

At 250, a weighted average of the different times at which the output neuron circuits transmitted the output spiking signals is determined. In at least one embodiment, the different spike times of the output neuron circuits are tracked with respect to a reference time. Such a reference time can be a point in time at which one or more input signals are detected or a point in time when one or more neuron circuits in the state space activation layer began to transmit spiking signals. In such an embodiment, a time lapse interval can be determined for each output neuron circuit that generated an output spiking signal using the reference time and the time at which the output neuron circuit generated an output spiking signal. The time difference values can be used to determine a weighted average of the time difference values. The weighted average can be transmitted as an output of the neural network.

Alternatively, the output of the network can be an aggregation of the different times other than a weighted average, such as a mean.

Optionally, at 260, the neural network can be trained by adjusting the weights associated with the temporal synapse circuits. An expected value associated with provided input can be provided. In at least one embodiment, a training spiking signal can be transmitted to the output neuron circuits. In such an embodiment, a spike time associated with the training spiking signal can be the expected value. When such an expected value is provided, the spike time associated with the training spiking signal and a spike time associated with an output spiking signal transmitted by an output neuron circuit can be used to adjust a weight of a temporal synapse circuit connected to the output neuron circuit. Since the spike times of the output neuron circuits can be controlled by the weights of the temporal synapse circuits, adjusting the weight of the temporal synapse circuit using the spike times of the training signal and the output neuron circuit spiking signal can move the spike time of the output neuron circuit towards the expected value.

In an embodiment where an output neuron circuit receives adjusted spiking signals from multiple temporal synapse circuits before transmitting an output spiking signal, the training spike time and the spike time for the output spiking signal can be used to adjust multiple weights associated with the multiple temporal synapse circuits that transmitted adjusted spiking signals to the output neuron circuit.

Figure 3:
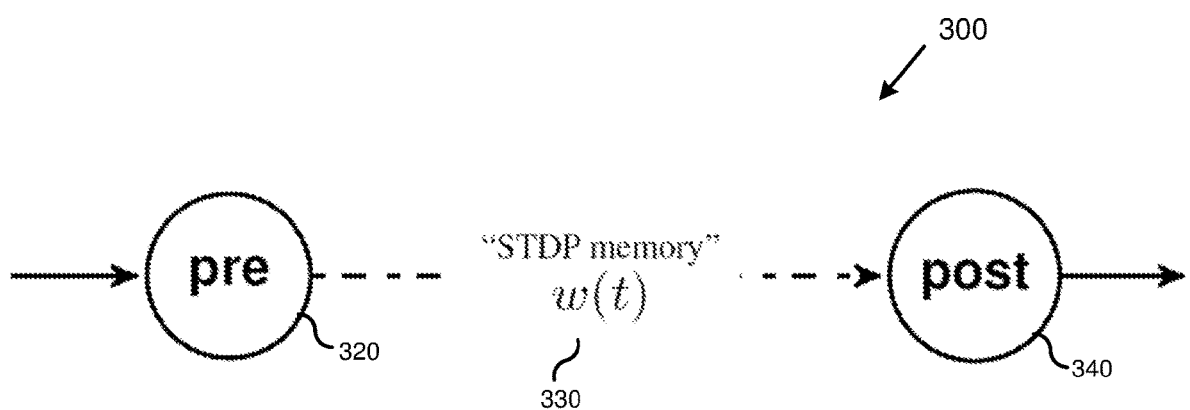
FIG. 3 is a diagram depicting example neuron circuits connected by an example spike time dependent plasticity (STDP) synapse circuit.

FIG. 3 is a diagram depicting an example network 300 comprising an example neuron circuit 320 connected to an example output neuron circuit post 340 by an example STDP synapse circuit 330. For simplicity, the neuron circuit pre 320 is represented below only by its spike times, $\{t_j^{pre}\}$, that are released through the STDP synapse circuit 330.

Example dynamics of the post neuron circuit 340 are given by a generic integrate-and-fire neuron circuit as follows:

$$\frac{dg}{dt} = -g/\tau_E, \quad (2)$$

$$\frac{dv}{dt} = (v_{rest} - v)/\tau_{rest} + g \cdot (rev_E - v)/d.$$

Here, g(t) describes the excitatory synaptic trace arriving at the post neuron 340, which decays exponentially in $\tau_E$. The variable v(t) encodes a capacity of the post neuron 340 that tends to exponentially decay back to some rest capacity $v_{rest}$ with $\tau_{rest}$. At the same time, v(t) is increased by the arriving synaptic trace g, scaled by a constant d. Here, $rev_E$ denotes an excitatory reversal potential, which scales and limits the excitatory effect. Analogously to the excitatory g, inhibitory traces can present, but are omitted for simplicity.

A weight associated with an STDP synapse circuit (e.g., circuit 330) can be dynamically adjusted when a neuron circuit (e.g., pre neuron circuit 320 or post neuron circuit 340) connected to the STDP synapse circuit transmits a spiking signal. For example, a value of a weight change potential associated with an output neuron circuit (e.g., post 340) connected to the STDP synapse circuit can be added to the weight of the STDP synapse circuit. Such an output neuron weight change potential can be adjusted (e.g., decreased) when the associated output neuron circuit transmits an output spiking signal. Alternatively or additionally, a value of another weight change potential associated with an input neuron circuit (e.g., pre 320) can be added to the weight of the STDP synapse circuit. Such a weight change potential can be adjusted (e.g., increased) when the input neuron circuit transmits a spiking signal to the STDP synapse circuit.

Example weight change potentials of the STDP synapse 330 can be described by $A_{pre}(t)$ and $A_{post}(t)$:

$$\frac{dA_{pre}}{dt} = -A_{pre}/\tau_{pre}, \quad (3)$$

$$\frac{dA_{post}}{dt} = -A_{post}/\tau_{post}.$$

Both, $A_{pre}$ and $A_{post}$ exponentially decay to their zero rest values with exponent $\tau_{pre}$ and $\tau_{post}$, respectively. On a presynaptic spike (i.e., a spike generated by pre neuron 320), besides increasing the synaptic trace g(t), the value of $A_{pre}$ is increased by some constant $A_+$, scaled by a maximal synaptic weight $\max_w$. Finally, the remaining $A_{post}$ trace is added to the weight value of the STDP synapse 330.

$$g^{new}=g+w,$$

$$A_{pre}^{new}=A_{pre}+A_+\cdot \max_w,$$

$$w^{new}=\min\{w+A_{post},\max_w\}. \quad (4)$$

A postsynaptic spike (i.e., a spike generated by post neuron 340), can be triggered when $v(t)>\Theta$ for some threshold $\Theta$. When a postsynaptic spike is triggered, the capacity $v(t)$ of the post neuron 340 is reset, $A_{post}$ is decreased by a scaled value of $A_-$, and the remaining $A_{pre}$ value is added to the synaptic weight of the STDP synapse 330:

$$v^{new}=v_{rest},$$

$$A_{post}^{new}=A_{post}-A_-\cdot \max_w,$$

$$w^{new}=\max\{w+A_{pre},0\}. \quad (5)$$

The latter can be interpreted as a facilitation due to correlation. For example, when the pre neuron 320 causes the post neuron 340 to spike, the STDP synapse circuit is facilitated, as it seems to be a necessary condition for the post neuron 340 to spike. On the other hand, when the post neuron 340 spikes, which accumulates some negative $A_{post}$ potential, and afterwards the pre neuron 320 spikes, some value is removed from the weight of the STDP synapse 330. I.e., the synapse 330 is depressed, as it seems to be an unnecessary condition for the post neuron 340 to spike.

Since the synaptic weight w is dynamic, w(t), as used herein, denotes a value of weight w at a time t. When a series of successive spike (a.k.a., a spike train) $\{t_j^{pre}\}$ is transmitted by the neuron pre 320, the spikes are amplified by the values of the synaptic weight at their respective spike times, $\{w(t_j^{pre})\}$. In at least some embodiments, each decaying with an action potential $\varepsilon(t)$ within the synapse 330. The total synaptic potential can be modeled as the sum of these traces: $g(t)=\Sigma_{j:t_j^{pre}<t}w(t_j^{pre})\varepsilon(t-t_j^{pre})$. The aggregated signal arrives at the connected post neuron 340 and excites the membrane potential v(t). Thus, a larger weight of the synapse 330 will cause the post neuron 340 to spike sooner than a smaller weight, since the larger weight will amplify the spike signal to a greater degree, which will cause the post neuron 340's integrated capacity level to exceed the threshold $\Theta$ sooner. Analogously, a number of spikes transmitted by the pre neuron 320 that is necessary to trigger a spike of the post neuron 340 depends on w(t). In at least some embodiments, the value of the membrane potential v(t) is configured to decay over time. In such an embodiment, given a sufficient amount of time, the value of the membrane potential v(t) over time will return to a resting value (e.g., 0).

Synaptic weight values can be mapped to specific spike times of the post neuron 340, relative to some start signal $t_0^{pre}$.

In any of the example systems described herein, two different encoding schemes can be applied: spatial coding and temporal coding.

Figure 5:
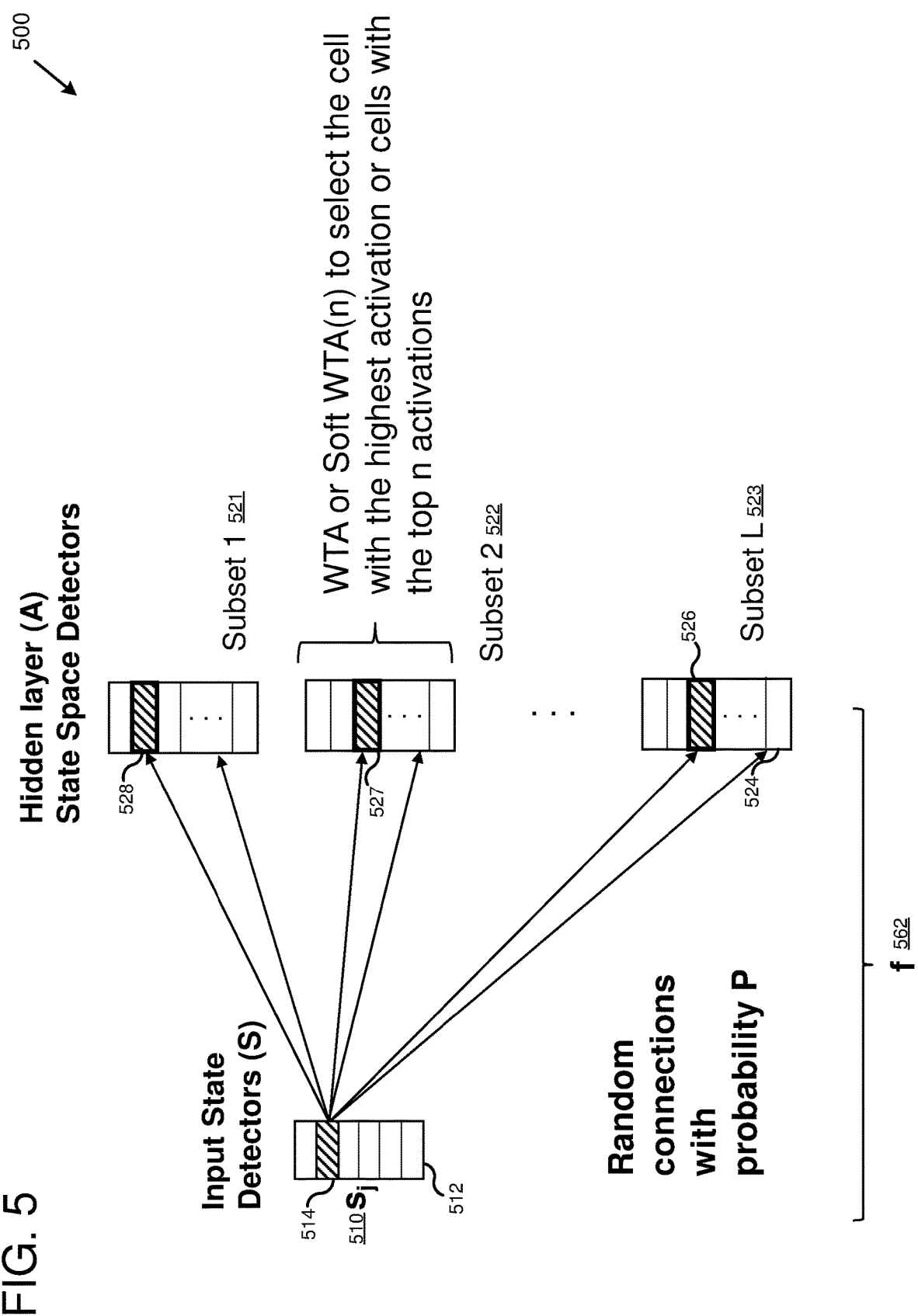
FIG. 5 is a block diagram depicting an example configuration for connecting input state detectors to state space detectors in a neural network in neuromorphic hardware.

FIG. 5 is a block diagram depicting an example configuration 500 for connecting input state detectors (e.g., 512 and 514) to state space detectors (e.g., 524, 526, 527, and 528). The connections between the input state detectors and the state space detectors can be synapse circuits in neuromorphic hardware. In at least some embodiments, the connections can implement a non-linear transformation f 562, which can convert one or more input signals into a spatial representation in a hidden layer comprising the state space detectors. Such a conversion can be realized, for example, by setting all synaptic weights of the synapse circuits connecting the input state detectors to the state space detectors such that a number of stimuli within a given time-range can activate a state space detector. In at least some embodiments, more computational entropy can be exploited by using particular weighted synapse circuits.

In a different or further embodiment, connections between the input state detectors and the state space detectors are created according to a random or pseudo-random distribution. For example, one or more connections can be created at random between a given input state detector and one or more state space detectors. In different or further embodiments, the connections can be created, subject to certain constraints. For example, in an embodiment where the state space detectors are organized into multiple subsets, connections can be created at random between a given input state detector and state space connectors in different subsets. In FIG. 5, for example, the input state detector 514 is connected to multiple state space connectors (e.g., 528) in a subset 1 521, multiple state space detectors (e.g., 527) in a subset 2 522, and multiple state space detectors (e.g., 526) in a subset L 523. Connections between inactive input state detectors and the state space detectors are omitted for clarity. In FIG. 5, the active input state detector 514 is part of an input state detector set 510. Other sets of input state detectors can also exits. In at least some embodiments, input state detectors in different input state detector sets can be connected to states space detectors in different subsets. In at least some embodiments, the connections between the input state detectors and the state space detectors are static and will not change once they have been created.

The state space detectors 526, 527 and 528 are depicted as active. In at least some embodiments, a single state space detector is activated in each of the L subsets 521-523 in response to receiving signals from the input state detectors. For example, the state space detectors can form a winner-take-all (WTA) circuit. In such a WTA circuit, an earliest spiking state space detector in a given subset, and/or a state space detector in which received a largest number of simultaneous input signals with respect to the other state space detectors within the subset, can inhibit other state space detectors within the subset. For example, a state space detector in the subset that receives a greatest number of input signals (and/or an earliest input signal) can transmit inhibiting signals to other state space detectors in the subset and transmit a spiking signal to one or more connected synapse circuits.

In embodiments where the state space detectors in each of the L subsets 521-523 form WTA circuits, a state in the hidden layer A can be represented by exactly L active state space detectors, one in each of the L subsets 521-523.

In a different or further embodiment, the state space detectors in a subset can form a soft winner-take-all (Soft WTA) circuit. In such an embodiment, n state space detectors within the subset with the top activations can be activated. The top n activations can be, for example, the n state space detectors in the subset that receive signals from input state detectors the soonest and/or receive the largest number of signals. For example, two or more state space detectors in the subset that receive a greatest number of input signals from input state detectors can transmit inhibiting signals to other state space detectors in the subset and transmit different spiking signals to different synapse circuits. In at least some embodiments, the different synapse circuits can be connected to a same output node in the output layer.

In at least some embodiments, activated state space detectors can simultaneously (or nearly simultaneously) spike at a same time $t_0$. However, in alternative embodiments, $t_0$ can represent a different spiking time relative to the spiking of each activated state space detector. In different or further embodiments, reference time $t_0$ can be enforced using synfire-chain construction.

The time $t_0$ can serve as a reference point for temporal coding which can be used to encode the information for the linear transformation g (e.g., g 164 in FIG. 1) between state space detectors in a hidden and output nodes in an output layer.

Various configurations for connecting the output nodes to the state space detectors are possible. For example, in the example system 100 in FIG. 1, L output nodes (e.g., 142, 144, and 146) are connected to state space connectors in L subsets 121-123. For example, each of the L output nodes (e.g., 142, 144, and 146) can be fully connected to all state space detectors in a corresponding subset of the hidden layer A. In such a configuration, every state space detector subset can trigger a spike in its corresponding output node and the specific spike time depends on a weight of a temporal synapse circuit connecting an activated state space detector in a subset to the subset's corresponding output node.

Figure 6:
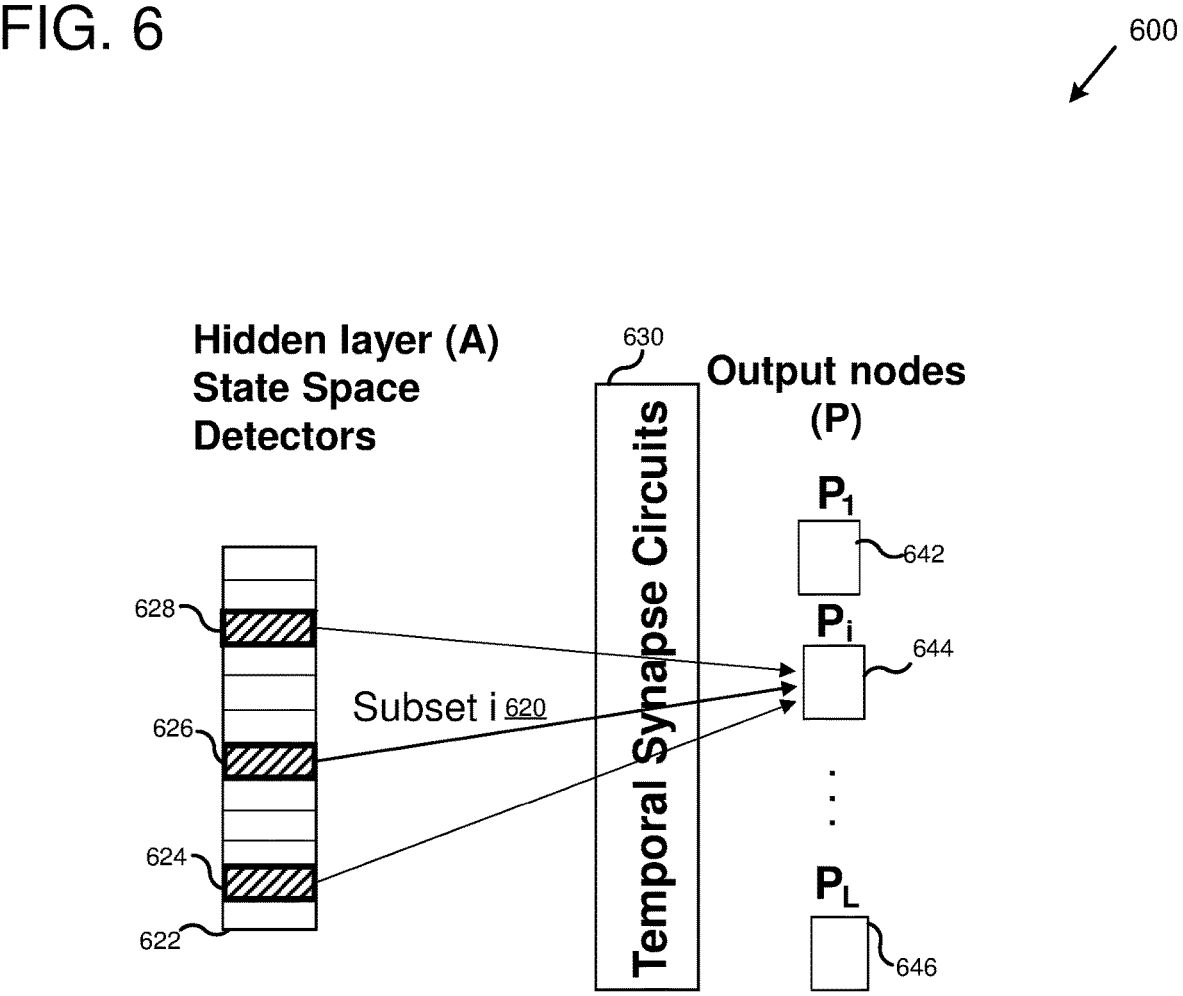
FIG. 6 is a block diagram depicting an example configuration for connecting state space detectors to output nodes using temporal synapse circuits.

FIG. 6 is an example configuration 600 for connecting state space detectors (e.g., 622, 624, 626, and 628) in an example state space detector subset i 620 to an example output node $P_i$ 644. L output nodes 642-646 correspond to L state space detector subsets, including the state space detector subset i 620. In the example configuration 600, the state space detectors in the subset i 620 form a Soft WTA circuit. The state space detectors 624, 626, and 628 are depicted as active and transmitting spiking signals to the output node $P_i$ 644 via temporal synapse circuits 630. In at least some embodiments, each activated state space detector in the subset i 620 transmits a spiking signal via a different temporal synapse circuit. The different temporal synapse circuits can have different associated weights which, in some cases, can cause the spiking signals transmitted by the active state space detectors 624, 626, and 628 to be adjusted by different amounts before they are received by the output node $P_i$ 644. The output node $P_i$ 644 can comprise an activation capacity (not shown) to which the adjusted spiking signals from all the activated state space detectors 624, 626, and 628 can be applied. When the activation capacity has a value greater than or equal to a specified threshold, the output node $P_i$ 644 can generate an output spiking signal. For the sake of clarity, connections between inactive state space detectors and the output nodes are not depicted.

Figure 7:
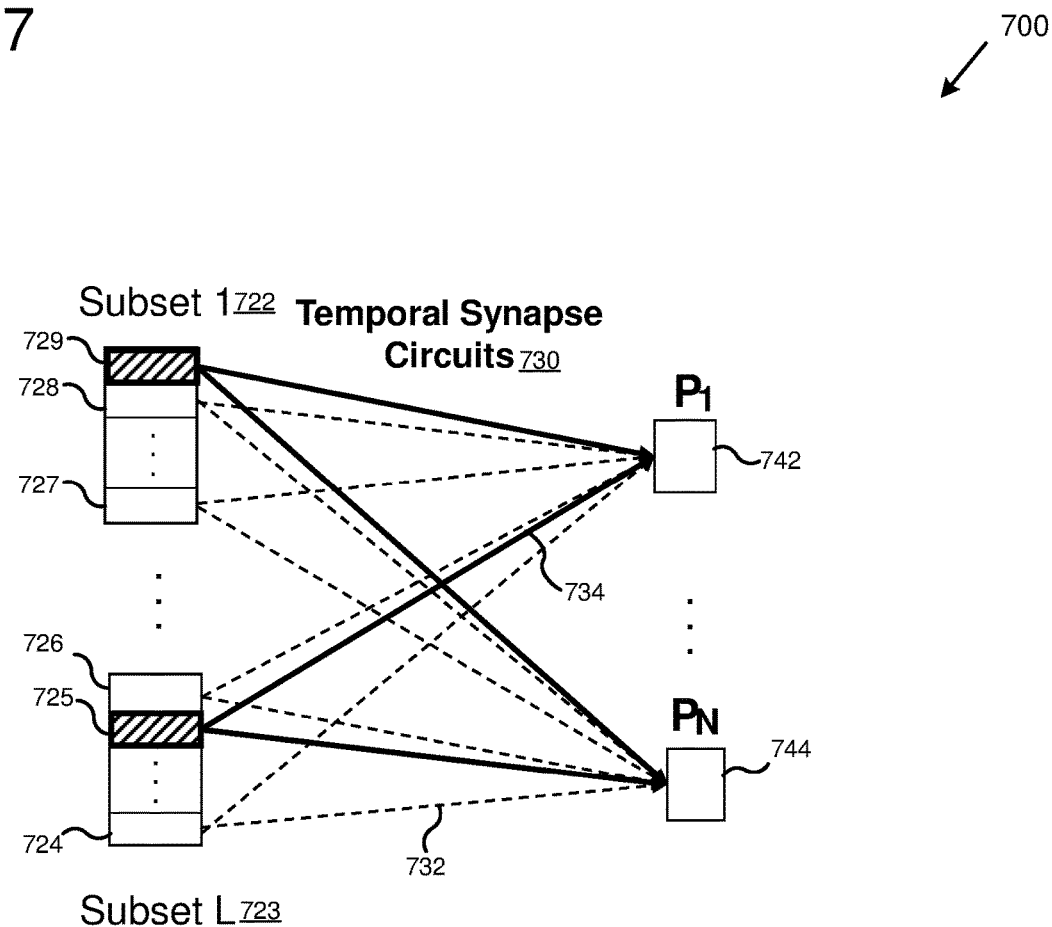
FIG. 7 is a block diagram depicting another example configuration for connecting state space detectors to output nodes using temporal synapse circuits.

FIG. 7 is a block diagram depicting another example configuration 700 for connecting state space connectors (e.g., 724-729) in L subsets 722-723 to N output nodes 742-744. In the example configuration 700, state space detectors in multiple subsets are connected to each of the N output nodes 742-744. For example, the state space connectors 724-726 in the subset L 723 are each connected to the output node $P_1$ 742 and the output node $P_N$ 744. Similarly, the state space connectors 727-729 in the subset 1 722 are each connected to the output node $P_1$ 742 and the output node $P_N$ 744.

The state space detectors 724-729 are connected to the output nodes 742-744 by temporal synapse circuits 730. Inactive temporal synapse circuits are depicted as dashed lines (e.g., 732) and active temporal synapse circuits are depicted as solid lines (e.g., 734). In such a configuration, an active state space detector can transmit one or more spiking signals to multiple output nodes simultaneously and an output node can receive spiking signals from multiple state space detectors. For example, the state space connectors 725 and 729 are depicted as active and transmitting spiking signals to the output nodes 742 and 744 via multiple, separate temporal synapse circuits. The N output nodes 742-744 can comprise activation capacities (not shown) to which the spiking signals from the activated state space detectors 725 and 729 can be applied. When an activation capacity of an output node has a value greater than or equal to a specified threshold, the output node can generate an output spiking signal. The temporal synapse circuits 730 can be associated with separate weights that can be used to adjust spiking signals before transmitting the spiking signals to the N output nodes 742-744.

Figure 4:
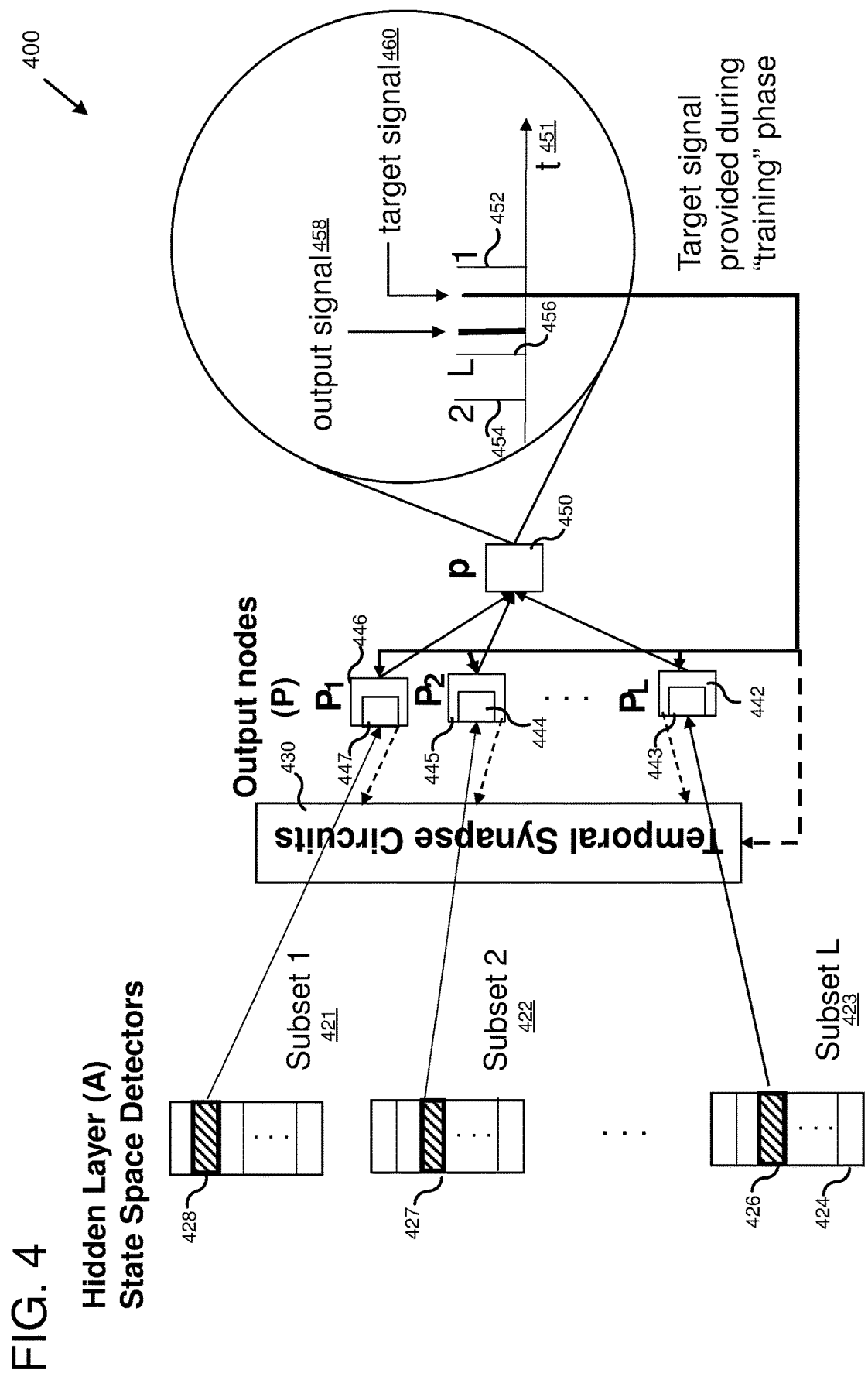
FIG. 4 is a block diagram depicting an example system for training a neural network in neuromorphic hardware.

FIG. 4 is a block diagram depicting an example system 400 for training a neural network in neuromorphic hardware. The neural network can be trained by adjusting the weights associated with the temporal synapse circuits 430. For example, the weights can be stored in the temporal synapse circuits 430 connecting the state space detectors (e.g., 424, 426, 427, and 428 in subsets 423-421) and the L output nodes (e.g., 442, 445, and 446). By dynamically adjusting the weights of the temporal synapse circuits, corresponding output spike times of the output nodes (e.g., 442, 445, and 446) are adjusted such that, for every training iteration, an output spike time $t_j-t_0$ (j≤L) of an output is shifted towards target signal $t_{ref}-t_0$. Each of the output nodes (e.g., 442, 445, and 446) comprises a membrane potential (e.g., 443, 444, and 447) that models an activation capacity of the respective node. When a value of a membrane potential of an output node meets or exceeds an associated threshold, the output node can generate an output spike. Thus, synaptic weight adjustments can adjust output spike times of the output nodes, as larger synaptic weights can lead to earlier output spikes and smaller synaptic weights can lead to later output spikes.

An output spike signal accumulator p 450 is configured to generate an output signal 458 based on output spike times of active output nodes (e.g., 442, 445, and 446). In at least one embodiment, the output signal 458 can be an average of the output spike times of the active output nodes (e.g., 442, 445, and 446) in an output layer P:

$$p(s) = \frac{\sum_{j:a_j(s)=1} P_j(t_0)}{l}, \quad (6)$$

where $a_j$ denotes an indicator of the activity of a state space detector in a hidden layer A during a current training iteration, and l denotes a number of active output nodes in the output layer P. In at least some embodiments, l is less than L. For example, this may occur when a state space detector subset contains at most one active synapse circuit. In at least some embodiments, weighted and/or translated averages other than the average of the output spike times of the active output nodes can be used.

During training, a desired target signal 460 that corresponds to input provided to the neural network is provided. Timeline 451 depicts a temporal relationship between an example output spike time 452 for the output node 446, an example output spike time 454 for the output node 445, an example output spike time 456 for the output node 442, the output signal 458 based on the example spike times 452-456, and the target signal 460.

The target signal 460 can be used to dynamically adjust one or more synaptic weights of one or more of the temporal synapse circuits. In at least some embodiments, the target signal 460 is provided to one or more of the temporal synapse circuits. In a different or further embodiment, the target signal 460 is provided to one or more of the active output nodes (e.g., 442, 445, and 446).

In at least some embodiments, temporal synapse circuits involved in training of a single target value can approach that target value after a few training iterations. In some embodiments, certain temporal synapse circuits can participate in the training of more than one target value. In such an embodiment, a final output spike time of a connected output node can represent a weighted average of the more than one target value, weighted over their absolute occurrences. Thus, in various cases, the summands in Equation 6 can either be precise target values or weighted averages of the target values of neighboring states. Such a configuration can promote positive generalization comprising an approximation accuracy which is bound by a number of state space detectors, relative to a number of different input signals. In certain applications, such as robotics, interpolating between values that appear during training can be important. In some cases, precision can be increased by averaging the error out over multiple sub-layers in the hidden layer A.

The different encoding schemes (spatial and temporal encoding) applied during the two transformations (f and g) can allow for a separation of the representations (i.e., discretizations) of the input and output signals. The discretization of the input signal can depend on an accuracy of one or more signals provided by the input layer (e.g., a sensor device). The accuracy in the output layer can depend on an available time resolution and, in some cases, a maximal number of neuron circuits and synapse circuits of the neuromorphic system.

In at least some embodiments, temporal encoding can have several advantages over rate encoding. For example, temporal encoding can be faster and have a higher information density than rate encoding. Additionally or alternatively, temporal encoding can utilize fewer spikes than rate encoding and, therefore, can have a lower energy consumption.

Example 3—Example Neuromorphic Hardware Device

In any of the examples described herein, a neuromorphic hardware device can be a hardware device comprising one or more neuromorphic processing units. A neuromorphic processing unit can comprise multiple neuron circuits and multiple synapse circuits. Unlike a processing unit in a traditional Von Neumann architecture, which processes instructions based on a clock cycle, a neuromorphic processing unit can process multiple signals in parallel using neuron circuits and synapse circuits that behave similarly to neurons and synapses in a neuro-biological architecture. A neuromorphic processing unit can be placed into a configuration mode, during which connections between neuron circuits and synapse circuits can be dynamically created. Connections can be created to create a neural network out of neuron circuits, with synapse circuits in between. Once the neuromorphic processing unit is configured, signals can be processed simultaneously by different neuron circuits without coordination.

Examples of neuromorphic hardware devices include IBM TRUENORTH, QUALCOMM ZEROTH, Systems of Neuromorphic Adaptive Plastic Scalable Electronics (SyNAPSE) arrays, and devices based on multi-core ARM chips like the SpiNNaker System developed at the University of Manchester, digital-analog chips like the HICANN System of the University of Heidelberg, and the like.

Example 4—Example Neuron Circuit

In any of the examples described herein, a neuron circuit can be a circuit configured to receive one or more signals via one or more input channels and to transmit one or more spiking signals via one or more output channels. Various embodiments of neuron circuits are possible. Example embodiments of neuron circuits include follower-integrator circuits, log-domain circuits, axon-hillock circuits, integrate and fire circuits, voltage amplifier integrate and fire circuits, switched-capacitor circuits, and the like.

Example 5—Example Temporal Synapse Circuit

In any of the examples described herein, a temporal synapse circuit can be a circuit configured to alter a value of one or more spiking signals in order to adjust a spike time of one or more neuron circuits. A temporal synapse circuit can be a spike time dependent plasticity (STDP) synapse circuit configured to adjust a received spiking signal with a synapse weight stored in the circuit. The synapse weight can be dynamically modified when a connected neuron circuit generates a spiking signal and/or based on a training signal. In at least some embodiments, an adjusted synapse weight can decay over time until it returns to an original value. Example STDP circuits include circuits configured to dynamically adjust potentials associated with preceding connected neuron circuits ($A_{pre}$) and/or potentials associated with subsequent connected neuron circuits ($A_{post}$).

Temporal synapse circuits with alternative implementations of the Hebbian learning rule (such as rate-based learning, the Bienenstock-Cooper-Munro rule for synaptic plasticity, etc.) and/or backpropagation rule are also possible.

In at least some embodiments, temporal synapse circuits can be implemented using analog electronic circuits based on silicon substrates. In a different or further embodiment, a temporal synapse circuit can comprise analog electronic circuits and one or more external memories and/or one or more digital storage devices. In such an embodiment, a temporal synapse circuit can comprise circuitry configured to retrieve a weight associated with the temporal synapse circuit from a connected memory or storage device. In a different or further embodiment, an external controller can be used to dynamically adjust weights associated with temporal synapse circuits in response to certain events, such as the detection of output spiking signals transmitted from output neuron circuits.

In at least one embodiment, a weight associated with a temporal synapse circuit can be dynamically altered during an on-line learning process. For example, a training spiking signal can be used, in addition to a spiking signal of a neuron circuit connected to the temporal synapse circuit, to dynamically adjust the weight of the temporal synapse circuit to move an actual spike time of the connected neuron circuit closer to a spike time of the training spiking signal.

In a different or further embodiment, a weight associated with a temporal synapse circuit can be determined during an off-line learning process and then applied to the temporal synapse circuit as a static weight. A neural network comprising such temporal synapse circuits may be used to perform a single, particular task and/or realize a particular function.

Example 6—Neuromorphic Classification and Regression

At least some of the technologies described herein can be used in a variety of classification and regression scenarios. A training data set comprising pairs of one or more training inputs and associated training outputs can be used to train a temporal or spatio-temporal neural network as described herein. One or more training inputs can be converted to input signals and provided to input state detectors and an associated training output can be provided to the neural network as a target signal. An output signal generated by the network can be used in combination with the target signal to adjust weights associated with temporal synapse circuits, as described herein. After training, input signals can be provided to the network and the generated output signal can be used as a predicted value. For at least some classification scenarios, one or more features can be provided as input signals to the input state detectors and an associated class can be provided as a target signal. For at least some regression scenarios, one or more independent variable values can be provided as input signals and an associated dependent variable value can be provided as the target signal. In a particular embodiment, future values in a time series can be predicted using past values in the time series. In such an embodiment, one or more values in the series can be provided as input signals and a subsequent value in the series can be provided as the target signal. After training, one or more received values in the series can be provided as input signals and the generated output signal can be used as a prediction of a next value in the series. Such a time series can be, for example, a time series of sensor readings. A future sensor readings could be predicted by the network based on one or more previous sensor readings.

Example 7—Neuromorphic Scheduler for a NUMA Architecture

Figure 8:
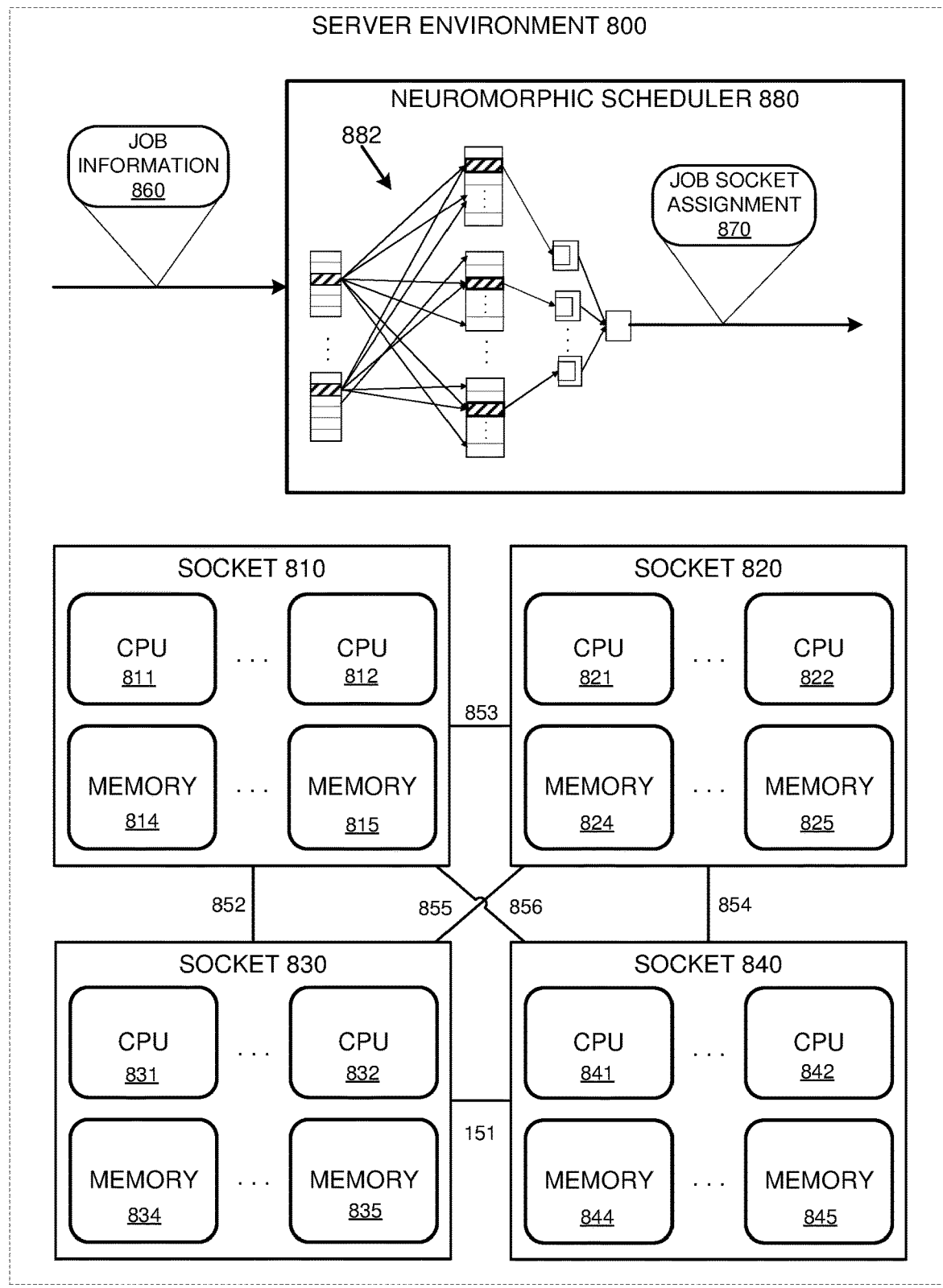
FIG. 8 is a block diagram depicting an example system for scheduling jobs in a non-uniform memory access (NUMA) architecture using a neuromorphic scheduler.

FIG. 8 is a block diagram depicting an example server environment 800 configured to schedule processing jobs on sockets (e.g., 810, 820, 830, and 840) organized in a non-uniform memory access (NUMA) architecture using a neuromorphic scheduler 880.

The example server environment 800 includes sockets (a.k.a. NUMA nodes) 810, 820, 830, and 840. Each socket in example server environment 800 contains one or more central processing units (CPUs) (e.g., 811-812, 821-822, 831-832, and 841-842) and one or more units of memory (e.g., 814-815, 824-825, 834-835, and 844-845). The example server environment 800 can implemented by various types of computing devices, such as computer servers, data storage systems, cloud computing resources, networking resources, etc.

A CPU can directly access memory located on the same socket as the CPU. For instance, example socket 810 comprises CPUs 811 through 812. Each of CPUs 811 through 812 is capable of directly accessing memory units 814 through 815 located on socket 810. Similarly, CPUs 821 through 822 on socket 820 are capable of directly accessing memory units 824 through 825, CPUs 831 through 832 on socket 830 are capable of directly accessing memory units 834 through 835, and CPUs 841 through 842 on socket 840 are capable of directly accessing memory units 844 through 845. Memory located on the same socket as a CPU that is accessing the memory may be referred to as "local memory." In general, a given socket can contain zero or more CPUs, each with one or more cores.

A CPU on a socket may also be capable of accessing memory on another socket. Memory located on a different socket from a CPU that is accessing the memory may be referred to as "remote memory." For instance, CPUs 811 through 812 on Socket 810 are capable of accessing memory 824 through 825 on socket 820 via communication channel 853. Communication channels between sockets (e.g., 851-856) may allow direct access to remote memory (e.g., INTEL QUICKPATH Interconnect, AMD HYPERTRANSPORT, or the like), indirect access to remote memory (e.g., front-side bus, network interface, or the like), or any combination thereof. Remote memory access may be performed with the same rate of access as local memory access, or remote memory access and local memory access may be performed at different rates of access.

A socket may contain one or more units of memory. For instance, socket 810 comprises memory units 814 through 815. Similarly, socket 820 comprises memory units 824 through 825, socket 830 comprises memory units 834 through 835, and socket 840 comprises memory units 844 through 845. Memory on a socket may be tangible memory, such as volatile memory (e.g., registers, cache, RAM), non-volatile memory (e.g., ROM, EEPROM, flash memory, etc.), or some combination of the two, virtual memory, or any combination thereof. In some implementations, a socket may access remote memory (e.g., using remote direct memory access (RDMA)). With RDMA, remote memory on another machine can be accessed directly using specific addresses, similar to accessing local memory, but with different latency.

CPUs on the sockets 810, 820, 830, and 830 can be used to perform processing jobs. While performing a processing job, a CPU can access local memory and/or remote memory. For example, while processing a given job, one or more of the CPUs 811-812 can access data stored in one or more of the local memories 814-815 and/or one or more of the remote memories 824-825, 834-835, and 844-845.

In at least some cases, a local memory can be accessed by a socket CPU faster than a remote memory. In such cases, performance of a job can be improved by processing the job on a socket where data accessed by the job is stored in local memory. However, software-based job scheduling can be computationally expensive, especially in NUMA architectures with large numbers of sockets. A spatio-temporal spiking neural network, as described herein, can be used to can be used to dynamically schedule jobs in a NUMA architecture, and, at least in some cases, at faster speeds that can be achieved with a software-based scheduler.

The neuromorphic scheduler 880 comprises a spatio-temporal spiking neural network 882 as described herein. The spatio-temporal spiking neural network 882 can be configured to receive job information 860 and to generate a socket assignment 870 for the job as an output signal. The neuromorphic scheduler 880 can be configured to schedule the job to be processed by one or more CPUs on the socket identified by the socket assignment 870.

The job information 860 can comprise various data about the job, such as identifiers of tables or objects that will be accessed by the job, an estimated number of data items that will be accessed by the job, etc. The neuromorphic scheduler 880 can convert the job information 860 into one or more signals that are transmitted to one or more input circuits in the spatio-temporal spiking neural network 882. In at least some embodiments, additional information about a state of the system (such as load factors, queue lengths, memory-interconnect bandwidth, connection topology, memory distribution, etc.) can also be provided as signals to the input circuits of the spatio-temporal spiking neural network 882.

The spatio-temporal spiking neural network 882 can be trained using data captured by replaying previously requested jobs. A system simulator can be used to replay the previously requested jobs. While replaying the previously requested jobs, the system simulator can be used to determine dynamic system parameters and simulate future outcomes of job scheduling. The results of the system simulator can be analyzed to determine which socket in the NUMA architecture would have been a best match for a given job. Information for the given job can be the basis for input signals to the spatio-temporal spiking neural network 882 and a signal representing the best match socket can be provided to the spatio-temporal spiking neural network 882 as a target signal. By repeating this process for the other previously requested jobs, the spatio-temporal spiking neural network 882 can be trained to predict which of the sockets 810-840 will be a best match for a newly requested job.

Example 8—Example Computing Systems

Figure 9:
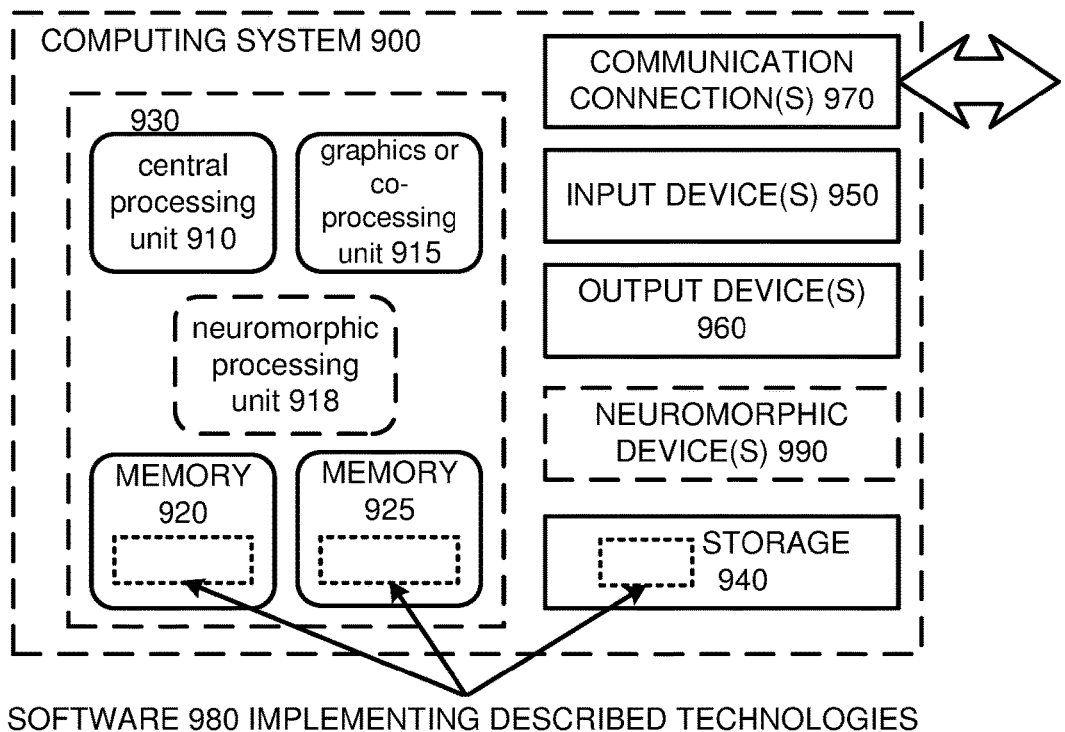
FIG. 9 is a block diagram of an example computing system in which some described embodiments can be implemented.

FIG. 9 depicts a generalized example of a suitable computing system 900 in which the described innovations may be implemented. However, in practice, the technologies described herein can be targeted to specialized neuromorphic hardware as described herein. The computing system 900 is not intended to suggest any limitation as to scope of use or functionality, as the innovations may be implemented in diverse general-purpose or special-purpose computing systems.

With reference to FIG. 9, the computing system 900 includes one or more processing units 910, 915 and memory 920, 925. In FIG. 9, this basic configuration 930 is included within a dashed line. The processing units 910, 915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 9 shows a central processing unit 910 as well as a graphics processing unit or co-processing unit 915. The tangible memory 920, 925 may be volatile memory (e.g., registers, cache, RAM), non-volatile memory (e.g., ROM, EEPROM, flash memory, solid state drives, etc.), or some combination of the two, accessible by the processing unit(s). The memory 920, 925 can store software 980 implementing one or more innovations described herein, in the form of computer-executable instructions suitable for execution by the processing unit(s).

The computing system 900 can comprise one or more neuromorphic processing units 918 as described herein. Such neuromorphic processing units 918 can work in conjunction with or replace the central processing units 910.

A computing system may have additional features. For example, the computing system 900 includes storage 940, one or more input devices 950, one or more output devices 960, and one or more communication connections 970. An interconnection mechanism (not shown) such as a bus, controller, or network interconnects the components of the computing system 900. Typically, operating system software (not shown) provides an operating environment for other software executing in the computing system 900, and coordinates activities of the components of the computing system 900.

The tangible storage 940 may be removable or non-removable, and includes magnetic disks, magnetic tapes or cassettes, solid state drives, CD-ROMs, DVDs, or any other medium which can be used to store information in a non-transitory way and which can be accessed within the computing system 900. The storage 940 can store instructions for the software 980 implementing one or more innovations described herein.

The input device(s) 950 may be a touch input device such as a keyboard, mouse, pen, or trackball, a voice input device, a scanning device, or another device that provides input to the computing system 900. For video encoding, the input device(s) 950 may be a camera, video card, TV tuner card, or similar device that accepts video input in analog or digital form, or a CD-ROM or CD-RW that reads video samples into the computing system 900. The output device(s) 960 may be a display, printer, speaker, CD-writer, or another device that provides output from the computing system 900.

The communication connection(s) 970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The computing system 900 can comprise one or more neuromorphic hardware devices 990 as described herein. Such devices can be separate from or incorporate the neuromorphic processing units 918, or both.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 9—Example Cloud Computing Environment

Figure 10:
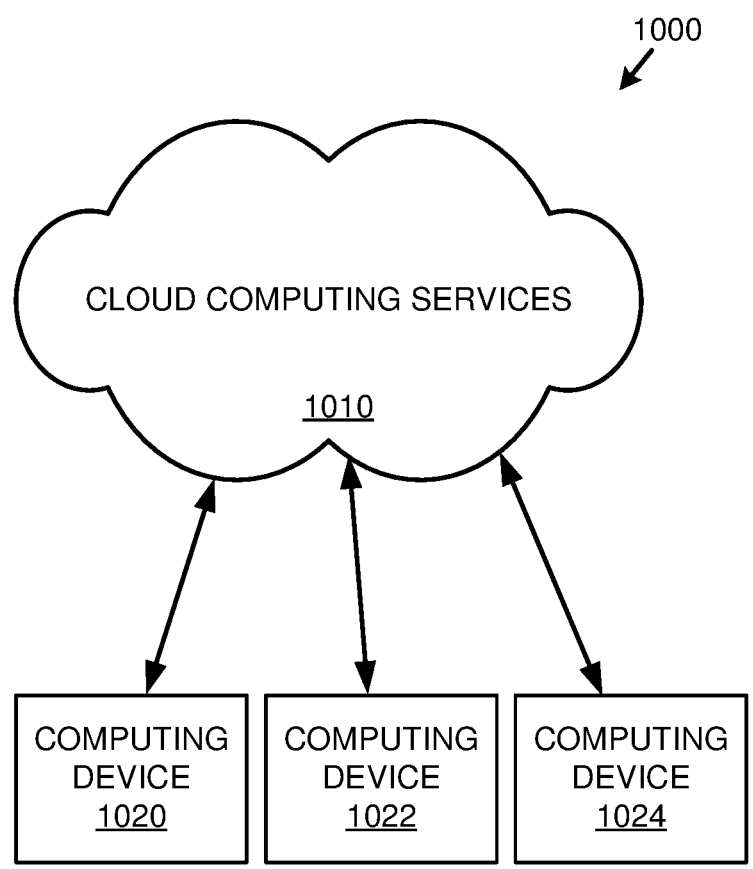
FIG. 10 is an example cloud computing environment that can be used in conjunction with the technologies described herein.

FIG. 10 depicts an example cloud computing environment 1000 in which the described technologies can be implemented. The cloud computing environment 1000 comprises cloud computing services 1010. The cloud computing services 1010 can comprise various types of cloud computing resources, such as computer servers, data storage repositories, networking resources, etc. The cloud computing services 1010 can be centrally located (e.g., provided by a data center of a business or organization) or distributed (e.g., provided by various computing resources located at different locations, such as different data centers and/or located in different cities or countries).

The cloud computing services 1010 are utilized by various types of computing devices (e.g., client computing devices), such as computing devices 1020, 1022, and 1024. For example, the computing devices (e.g., 1020, 1022, and 1024) can be computers (e.g., desktop or laptop computers), mobile devices (e.g., tablet computers or smart phones), or other types of computing devices. For example, the computing devices (e.g., 1020, 1022, and 1024) can utilize the cloud computing services 1010 to perform computing operators (e.g., data processing, data storage, and the like).

Example 10—Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media can include any tangible media that can be accessed within a computing environment (e.g., one or more optical media discs such as DVD or CD, volatile memory components (such as DRAM or SRAM), or nonvolatile memory components (such as flash memory, solid state drives, or magnetic media such as hard drives)). By way of example and with reference to FIG. 9, computer-readable storage media include memory 920 and 925, and storage 940. The term computer-readable storage media does not include signals and carrier waves. In addition, the term computer-readable storage media does not include communication connections (e.g., 970).

For example, input circuits, neuron circuits and synapse circuits, as described herein, can be emulated and/or simulated using computer-executable instructions executed on traditional computing hardware.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technologies may be applied, it should be recognized that the illustrated embodiments are examples of the disclosed technologies and should not be taken as a limitation on the scope of the disclosed technologies. Rather, the scope of the disclosed technologies includes what is covered by the scope and spirit of the following claims.

What is claimed is:

1. A system comprising a spiking neural network in neuromorphic hardware, the spiking neural network comprising:
   a state space detection layer comprising multiple neuron circuits configured to transmit spiking signals to connected synapse circuits;
   the synapse circuits comprising stored weight values and configured to:
      apply the stored weights to the spiking signals,
      transmit the weighted spiking signals to connected output neuron circuits, and
      dynamically adjust the stored weights when a connected state space detection layer neuron circuit transmits a spiking signal or when a connected output neuron circuit transmits an output spiking signal;
   an output layer comprising the output neuron circuits, wherein the output neuron circuits comprise membrane potentials and are configured to:
      accumulate the weighted spiking signals from the synapse circuits at the membrane potentials, and
      transmit output spiking signals when the values of the membrane potentials are greater than specified thresholds; and
   an output spiking signal accumulator configured to:
      receive the output spiking signals,
      determine times at which the output spiking signals are received, and
      generate a network output signal based on the times at which the output spiking signals are transmitted by the output neuron circuits, comprising generating a weighted average of time difference values for the output spiking signals based on a reference time and the times at which the output spiking signals are received, wherein the reference time comprises a time at which one or more of the multiple neuron circuits in the state space detection layer transmits a spiking signal.

2. The system of claim 1, further comprising:
an input state detection layer comprising multiple input circuits configured to receive one or more input signals and transmit the one or more input signals to one or more of the multiple neuron circuits in the state space detection layer.

3. The system of claim 2, wherein:
the multiple neuron circuits in the state space detection layer are grouped into two or more subsets; and
the multiple input circuits in the input state detection layer are configured to transmit the input signals to neuron circuits in separate subsets.

4. The system of claim 3, wherein:
neuron circuits in at least one of the subsets are configured to transmit inhibitory signals to other neuron circuits within the subset, such that a neuron circuit in the subset that receives a greatest number of input signals from the input circuits inhibits the other neuron circuits in the subset and transmits a spiking signal to a connected one or more of the synapse circuits.

5. The system of claim 4, wherein:
the neuron circuit in the subset that receives the greatest number of input signals is configured to transmit a spiking signal to at least two different synapse circuits, wherein the different synapse circuits are connected to different output neuron circuits in the output layer.

6. The system of claim 3, wherein:
neuron circuits in at least one of the subsets are configured to transmit inhibitory signals to other neuron circuits within the subset, such that two or more neuron circuits in the subset that receive a greatest number of input signals from the input circuits inhibit the other neuron circuits in the subset and transmit spiking signals to different synapse circuits, wherein the different synapse circuits are both connected to a same output neuron circuit in the output layer.

7. The system of claim 1, wherein the synapse circuits are further configured to:
receive a desired target signal; and
dynamically adjust the stored weights based, at least in part, on a difference between the generated network output signal and the desired target signal.

8. The system of claim 1, wherein the output neuron circuits are further configured to decay the values of the membrane potentials over time.

9. A method for temporal encoding of information using a spiking neural network in neuromorphic hardware, the method comprising:
transmitting multiple spiking signals from multiple neuron circuits to multiple output layer neuron circuits over multiple temporal synapse circuits;
adjusting the multiple spiking signals using multiple weights associated with the temporal synapse circuits;
receiving the adjusted multiple spiking signals at the multiple output layer neuron circuits and adjusting capacities of the multiple output layer neuron circuits based on the received adjusted multiple spiking signals;
transmitting multiple output spiking signals from the multiple output layer neuron circuits when the adjusted capacities of the multiple output layer neuron circuits are greater than or equal to specified thresholds associated with the multiple output layer neuron circuits;
generating a weighted average of multiple time difference values for the multiple output layer neuron circuits based on a reference time and multiple times at which the multiple output layer neuron circuits transmitted the multiple output spiking signals, wherein the reference time comprises a time at which one or more input signals are detected; and
transmitting the weighted average of the multiple time difference values as an output signal of the neural network.

10. The method of claim 9, further comprising:
dynamically adjusting a weight associated with one of the temporal synapse circuits when one of the multiple neuron circuits that is connected to the temporal synapse circuit transmits a spiking signal.

11. The method of claim 10, wherein dynamically adjusting the weight associated with the temporal synapse circuit comprises:
adding a value of a weight change potential associated with an output layer neuron circuit connected to the temporal synapse circuit to the weight, wherein the weight change potential is decreased when the associated output layer neuron circuit transmits an output spiking signal.

12. The method of claim 9, further comprising:
dynamically adjusting a weight associated with one of the temporal synapse circuits when one of the multiple output layer neuron circuits that is connected to the temporal synapse circuit transmits an output spiking signal.

13. The method of claim 12, wherein dynamically adjusting the weight associated with the temporal synapse circuit comprises:
adding a value of a weight change potential associated with one of the multiple neuron circuits that is connected to the temporal synapse circuit to the weight, wherein the weight change potential is increased when the associated neuron circuit transmits a spiking signal to the temporal synapse circuit.

14. The method of claim 9, further comprising:
receiving multiple input signals at the multiple neuron circuits from multiple input circuits; and
transmitting the multiple spiking signals from the multiple neuron circuits responsive to receiving the multiple input signals.

15. The method of claim 14, wherein:
the multiple neuron circuits are organized into multiple subsets; and
transmitting the multiple spiking signals from the multiple neuron circuits to the multiple output layer neuron circuits comprises, for at least two of the multiple subsets:
identifying a neuron circuit, of the multiple neuron circuits, in the subset that received a greatest number of input signals as compared to other neuron circuits in the subset; and
transmitting a spiking signal from the identified neuron circuit to one or more of the multiple output layer neuron circuits.

16. The method of claim 15, wherein:
the at least two of the multiple subsets of neuron circuits are associated with different output layer neuron circuits; and
transmitting the multiple spiking signals from the multiple neuron circuits to the multiple output layer neuron circuits further comprises, for the at least two of the multiple subsets:

transmitting the spiking signal from the identified neuron circuit to an output layer neuron circuit associated with the subset.

17. The method of claim 15, wherein the identified neuron circuit transmits a spiking signal to at least two separate output layer neuron circuits via different temporal synapse circuits.

18. The method of claim 9, further comprising:
dynamically adjusting a weight associated with at least one of the multiple temporal synapse circuits based, at least in part, on a spike time of a training spiking signal and a spike time of a spiking signal transmitted by an output layer neuron circuit connected to the at least one of the temporal synapse circuits.

19. The method of claim 9, wherein generating the weighted average time of the multiple different times at which the multiple output layer neuron circuits transmitted the multiple output spiking signals comprises:
determining time lapse intervals based on one or more times at which the multiple neuron circuits began transmitting the spiking signals and the multiple different times at which the output spiking signals were transmitted by the multiple output layer neuron circuits.

20. A computer-readable storage medium storing computer-executable instructions that, when executed, configure a neuromorphic processing unit to create a spatio-temporal spiking neural network, the spatio-temporal spiking neural network comprising:
multiple neuron circuits organized into two or more subsets, wherein the multiple neuron circuits are configured to:
receive multiple input signals,
for at least one of the subsets, select a neuron circuit within the subset that received a greatest number of input signals with respect to other neuron circuits within the subset, and
transmit one or more spiking signals from the at least one selected neuron circuit to at least one synapse circuit connected to the at least one selected neuron circuit;
multiple spike-time dependent plasticity (STDP) synapse circuits storing synaptic weights and configured to:
receive the one or more spiking signals from the at least one selected neuron circuits,
amplify the received one or more spiking signals using the stored synaptic weights, and
transmit the amplified one or more spiking signals to one or more connected output neuron circuits;
multiple output neuron circuits comprising charge capacities and configured to:
receive the amplified one or more spiking signals,
store charges of the amplified one or more spiking signals in the charge capacities of one or more of the output neuron circuits, and
for at least one of the output neuron circuits:
detect that a stored charge in a charge capacity of the output neuron circuit is greater than a spiking threshold of the output neuron circuit; and
transmit an output spiking signal from the output neuron circuit; and
an output spiking signal accumulator configured to:
receive output spiking signals from the at least one of the output neuron circuits, and
generate an output signal based on multiple times at which the output spiking signals were received, comprising generating a weighted average of time distance values for the output neuron circuits based on a reference time and the multiple times at which the output spiking signals were received, wherein the reference time comprises a time at which one or more of the multiple input signals are received.

* * * * *